Dec. 28, 1926.

J. A. GRANT

LUGGAGE CARRIER FOR AUTOMOBILES

Filed Nov. 24, 1925

1,612,505

John A. Grant.
Inventor.
by T. L. Boyden.
Attorney.

Patented Dec. 28, 1926.

1,612,505

UNITED STATES PATENT OFFICE.

JOHN ALEXANDER GRANT, OF VICTORIA, BRITISH COLUMBIA, CANADA.

LUGGAGE CARRIER FOR AUTOMOBILES.

Application filed November 24, 1925. Serial No. 71,248.

This invention relates to detachable luggage carriers for automotive vehicles. Its object is to provide a handy and safe receptacle for parcels, suit cases, and other comparatively light articles entirely without encumbrance to the operation and use of the vehicle.

A further object of the invention is to utilize the usually wasted space in front of the radiator, behind the bumper bar and between the side members of the main frame which project beyond the front face of the radiator. The vertical space available for a device of the type in question, is from a horizontal plane coincident with the underside of the axle to a level on the top side which may be well above the bottom of the radiator, without any detriment to the efficiency of the latter. This is possible because the back of the receptacle of the carrier is so located as to leave ample clearance between it and the radiator front surface. Thus the area of the passage for the indraft of the air to the radiator remains unobstructed.

Figure 1:
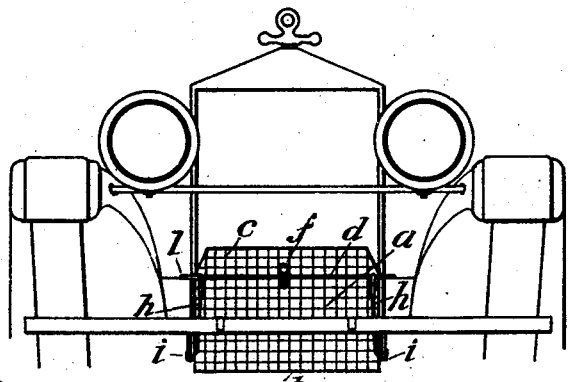
Figure 2:
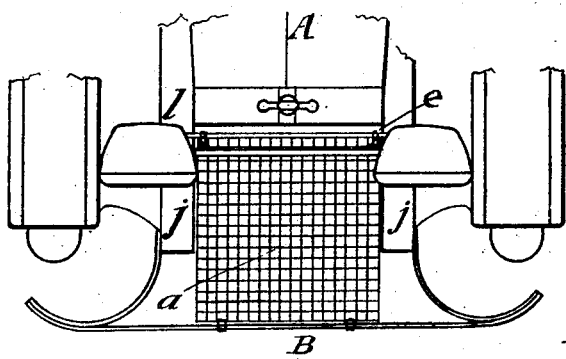
Figure 4:
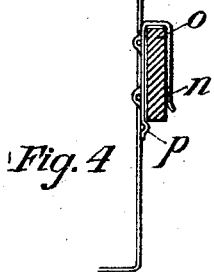
Figure 3:
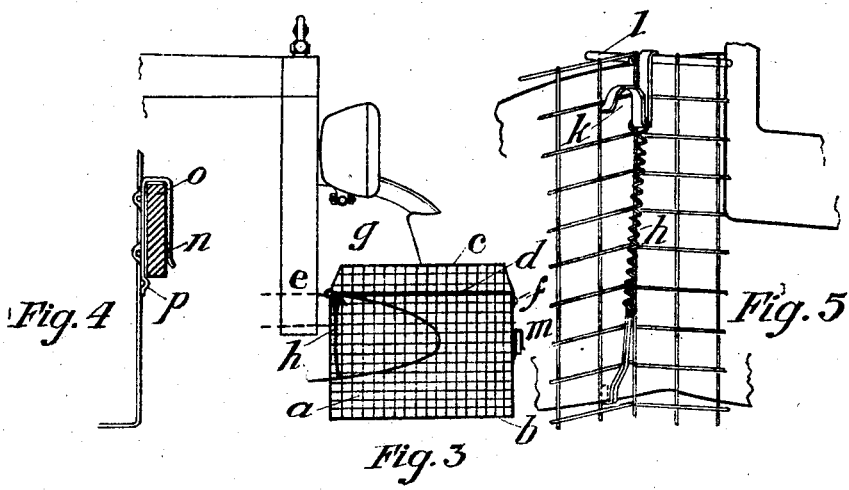
Figure 5:
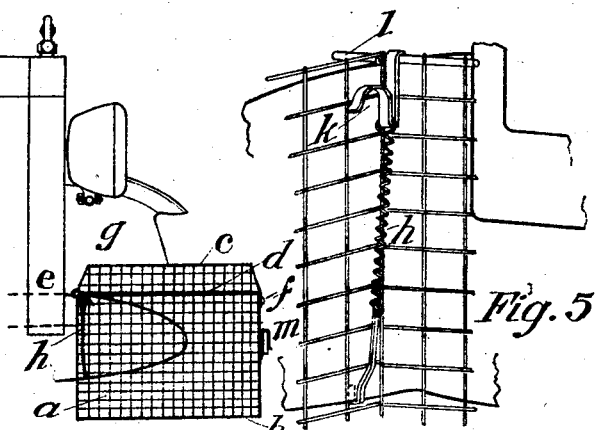

In the drawings herewith which form part of this application Fig. 1 is a front elevation of my device and the adjacent portions of an automobile, showing the location of the carrier. Fig. 2 is a plan of the same. Fig. 3 is a longitudinal section on line A. B. showing the front attachment of the receptacle to the bumper bar, and its location in reference to the radiator front. Fig. 4 shows an enlarged view of the locking clip attachment to the bumper and Fig. 5 shows a view of the spring attachment which secures the rear of the receptacle.

The receptacle of the carrier (a) is rectangular in plan and is preferably formed of stout wire mesh which is readily cleansable and avoids the collection of dust and débris. The underside (b) may be on an approximate level with the underside of the axle and thus utilizes an available cavity otherwise and usually wasted. The top (c) or cover of the receptacle is preferably of dished form, and is secured to the top frame (d) of the receptacle by the hooks (e) thus permitting the cover (c) to be readily detachable after it is released from the catch or lock at (f).

It is to be observed that the receptacle offers no impediment to the free flow of air to and through the radiator, as the clearance space (g) is so ample that the top of the receptacle may be raised considerably above the level shown in the drawing.

The method of securing the carrier so that it may be proof against the loosening effects of vibration is to attach it to the framework of the vehicle by a spring connection at each side. This connection may take a variety of forms, but I prefer to use a helical spring as shown at (h) which terminates in a hook at each extremity. The bottom end of this is hooked around the lower edge (i) of the front apron which covers the projecting portions of the side frame (j). The upper end of the spring (h) is provided with a finger grip (k) and is hooked over one of the lateral extensions (l) of the top frame of the receptacle, thus the carrier is held in firm contact with the frame of the automobile on each side. The spring catch (n) being within the receptacle, it is impossible to detach the latter when the cover is locked.

In order that the receptacle may be effectively secured—although immediately detachable—I adopt the device shown at (m) in Fig. 3 and in more detail in Fig. 4. This consists of a resilient hook (n) which engages the top bar of the bumper (o) and is locked in position by the projection (p) as the receptacle is forced down into position.

The shape of the front hook attachment (n) is such that when the receptacle is pushed down into position friction is set up against the bar (o) of the bumper so that it becomes impracticable to release the attachment until the rear end of the receptacle is raised which can only be effected by releasing the helical spring clips at the rear on each side.

The operation of the device is as follows: The receptacle is placed in position, an inch or two above its precise location with the rear end sufficiently raised for the two front attachment hooks to slip over the bar (o) of the bumper. The rear end is then depressed and the receptacle forced into position. The helical spring clips (h) are hooked under the front apron (i) on each side and extended by the finger grips so that the top catch may hook over the lateral extensions (l) of the receptacle frame. The cover is then hooked on and locked, rendering the entire device non-removable, except by cutting or other violence.

I claim:

1. In a luggage carrier for an automotive vehicle the combination comprising, a rectangular metal frame, and depending from said frame a box-like receptacle formed of wire mesh, the said receptacle being located within the cavity in front and largely below the level of the bottom of the radiator of the said automobile and between the two portions of its main frame which project beyond the front of the said radiator on each side thereof, lateral extensions on said rectangular metal frame, said extensions resting upon the said portions of main frame, helical springs terminating with a hook at each extremity, the said hooks engaging the said lateral extensions and also the underside of the inner cover-plate of the said projecting portions of the main frame respectively.

2. An automobile luggage carrier comprising a wire mesh receptacle of approximately rectangular form, the said receptacle being adapted to fit into the cavity between the main side frame members in front of the radiator and behind the front bumper of said automobile, lateral projections on each side of said receptacle, said projections resting upon the said side frame, helical spring catches, said catches engaging said lateral projections and the underside of the front apron which covers the inner and front projecting portions of said main side frame members, the said springs being located within the said receptacle but having their lower extremities threaded through the mesh of said receptacle and in effective engagement with the said main frame, a spring catch on the front of said receptacle, said catch being adapted to slide over the bar of the front bumper of said automobile and to lock itself under the said bar when depressed into position.

3. An automobile luggage carrier comprising a wire mesh receptacle of approximately rectangular form, the said receptacle being adapted to fit into the cavity between the main side frame members in front of the radiator and behind the front bumper of said automobile, lateral projections on each side of said receptacle, said projections resting upon the said side frame, helical spring catches, said catches engaging said lateral projections and the underside of the front apron which covers the inner and front projecting portions of said main side frame members, the said springs being located within the said receptacle but having their lower extremities threaded through the mesh of said receptacle and in effective engagement with the said main frame, a spring catch on the front of said receptacle, said catch being adapted to slide over the bar of the front bumper of said automobile and to lock itself under the said bar when depressed into position, a cover for said receptacle, said cover being provided with upturned hooks adapted to engage and hinge upon the framework of said receptacle, a locking device between said cover and said receptacle, all substantially as described and shown.

JOHN ALEXANDER GRANT.